United States Patent
Shellabarger

(10) Patent No.: US 6,179,323 B1
(45) Date of Patent: Jan. 30, 2001

(54) VEHICLE INFLATABLE SIDE CURTAIN ASSEMBLY

(75) Inventor: Richard E. Shellabarger, Sterling Heights, MI (US)

(73) Assignee: TRW Vehicle Safety Systems Inc., Lyndhurst, OH (US)

(*) Notice: Under 35 U.S.C. 154(b), the term of this patent shall be extended for 0 days.

(21) Appl. No.: 09/200,265

(22) Filed: Nov. 25, 1998

(51) Int. Cl.⁷ ................................................. B60R 21/22
(52) U.S. Cl. ...................... 280/730.1; 280/736; 280/740; 285/124.1; 285/179
(58) Field of Search ................................. 280/730.2, 736, 280/740, 742, 730.1; 285/124.1, 179, 188, 420

(56) References Cited

U.S. PATENT DOCUMENTS

| | | | |
|---|---|---|---|
| Re. 28,624 | * 11/1975 | Lewis et al. | 280/730.2 X |
| 830,436 | * 5/1906 | Patterson . | |
| 898,882 | * 9/1908 | Hawkins . | |
| 1,020,123 | * 3/1912 | Brampton et al. . | |
| 1,291,602 | * 6/1919 | Murray . | |
| 1,650,233 | * 11/1927 | Plunkett . | |
| 1,992,503 | * 2/1935 | Penick et al. . | |
| 3,197,234 | 7/1965 | Bertrand . | |
| 3,674,059 | 7/1972 | Stephenson . | |
| 3,770,387 | 11/1973 | Loomba . | |
| 3,774,807 | 11/1973 | Keathley et al. . | |
| 3,877,721 | * 4/1975 | Brown, Jr. | 280/730.2 |
| 3,904,222 | 9/1975 | Bursott et al. . | |
| 4,004,827 | 1/1977 | Kondo et al. . | |
| 4,084,839 | * 4/1978 | Takagi | 280/736 |
| 4,114,924 | * 9/1978 | Kasagi et al. | 280/740 |
| 5,316,336 | * 5/1994 | Taguchi et al. | 280/730.2 |
| 5,558,362 | * 9/1996 | Acker et al. | 280/736 X |
| 5,588,672 | * 12/1996 | Karlow et al. | 280/730.2 |
| 5,671,945 | * 9/1997 | Rhule et al. | 280/740 |
| 5,779,269 | * 7/1998 | Moore et al. | 280/736 X |
| 5,791,683 | * 8/1998 | Shibata et al. | 280/730.2 |
| 5,884,937 | * 3/1999 | Yamada | 280/730.2 |
| 5,899,491 | * 5/1999 | Tschaeschke | 280/730.2 |
| 5,924,723 | * 7/1999 | Brantman et al. | 280/730.2 |

* cited by examiner

Primary Examiner—Lanna Mai
Assistant Examiner—Toan To
(74) Attorney, Agent, or Firm—Tarolli, Sundheim, Covell, Tummino & Szabo L.L.P.

(57) ABSTRACT

A vehicle occupant safety apparatus (10) for helping to protect an occupant of a vehicle (12) having a side structure (16) comprises an inflatable vehicle occupant protection device (14). The protection device (14) has a deflated condition and has an inflated condition in which the protection device is inflated between the occupant and the vehicle side structure. The safety apparatus (10) also comprises an inflator (22) for providing inflation fluid for inflating the protection device (14), and a fill tube (20) for directing inflation fluid into the protection device. The apparatus further comprises a support (60) for supporting the inflator (22) and the fill tube (20) relative to each other. The support (60) has a fluid flow passage (210) for directing inflation fluid from the inflator (22) to the fill tube (20). In a preferred embodiment, the support (60) comprises a clamp having a first portion clamped on the inflator (22) and a second portion clamped on the fill tube (20).

10 Claims, 3 Drawing Sheets

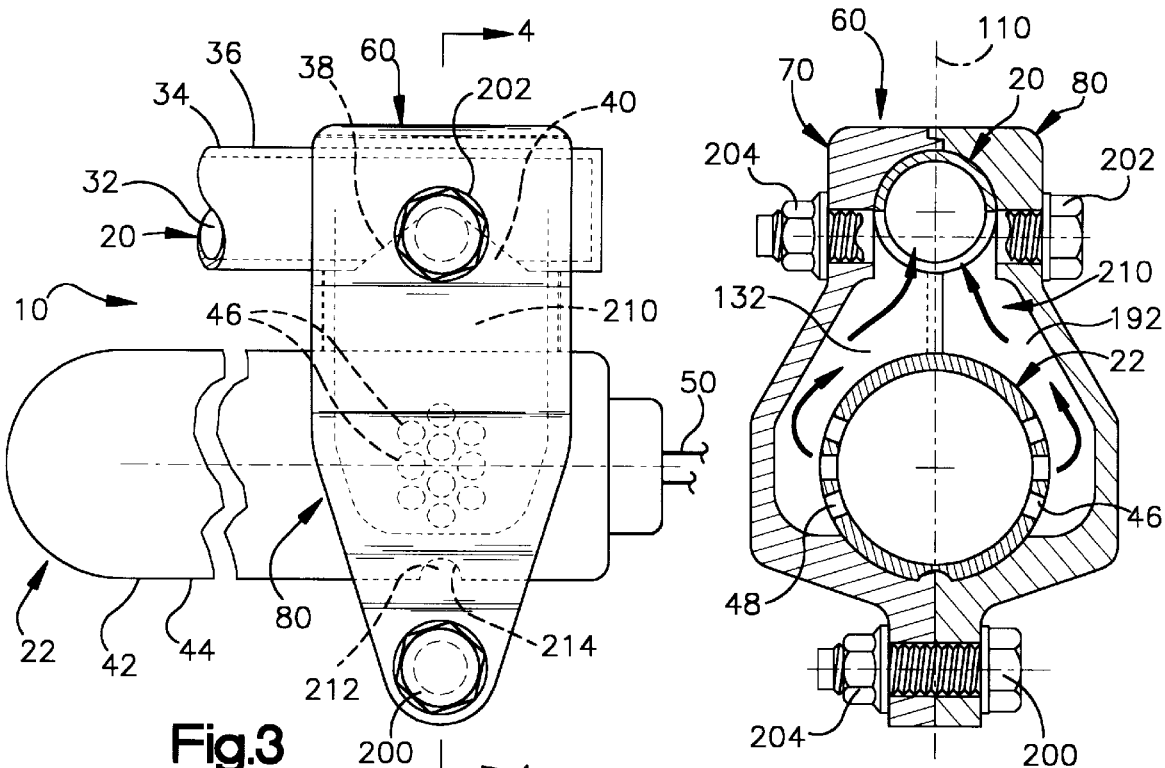
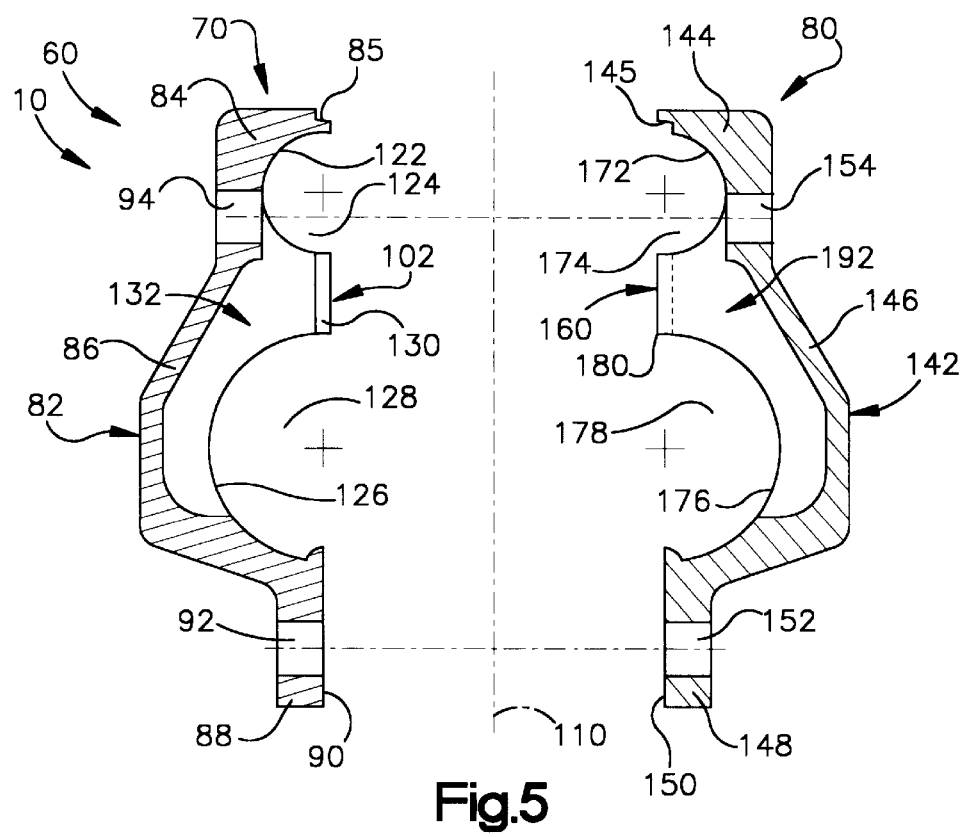

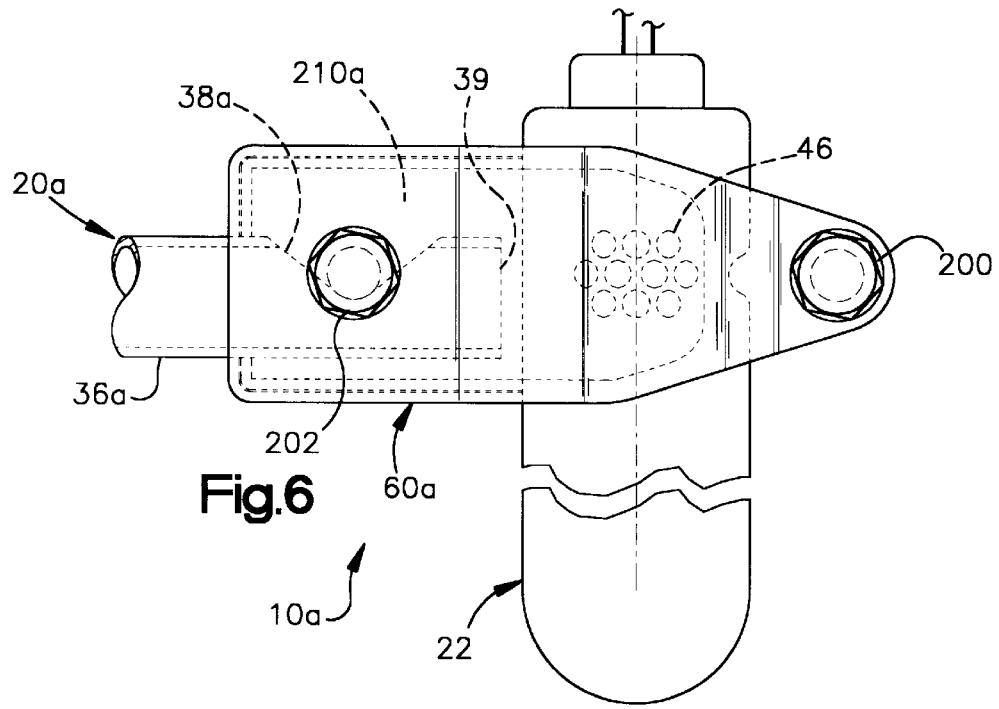
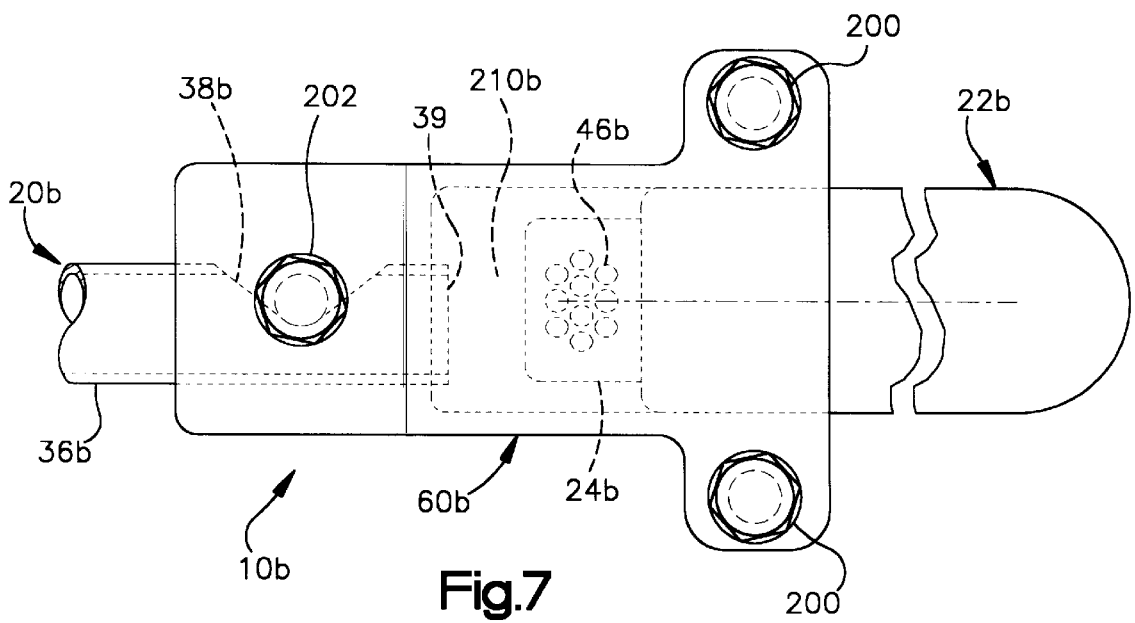

VEHICLE INFLATABLE SIDE CURTAIN ASSEMBLY

BACKGROUND OF THE INVENTION

1. Technical Field

The present invention relates to a vehicle safety apparatus. In particular, the present invention relates to an inflatable vehicle occupant protection device, such as a side curtain, for helping to protect a vehicle occupant in the event of a side impact to a vehicle.

2. Description of the Prior Art

It is known to inflate an air bag to help protect a vehicle occupant in the event of a vehicle collision. Some vehicles include an air bag in the form of a side curtain which is inflatable downward inside the side structure of the vehicle to help protect a vehicle occupant in the event of a side impact to the vehicle.

The side curtain is typically stored in a deflated condition along the roof rail above the side windows of the vehicle. The side curtain is part of a module including an inflator and a fill tube. Upon actuation of the inflator, inflation fluid is directed through the fill tube into the side curtain to inflate the side curtain.

SUMMARY OF THE INVENTION

The present invention is a vehicle occupant safety apparatus for helping to protect an occupant of a vehicle having a side structure. The safety apparatus comprises an inflatable vehicle occupant protection device having a deflated condition and having an inflated condition in which the protection device is inflated between the occupant and the vehicle side structure. The safety apparatus also comprises an inflator for providing inflation fluid for inflating the protection device, and a fill tube for directing inflation fluid into the protection device. The apparatus further comprises a support for supporting the inflator and the fill tube relative to each other. The support has a fluid flow passage for directing inflation fluid from the inflator to the fill tube.

In a preferred embodiment, the support comprises a clamp having a first portion clamped on the inflator and a second portion clamped on the fill tube.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is an elevational view of a portion of the safety apparatus of FIG. 1, including the clamp of FIG. 2;

FIG. 4 is a sectional view taken generally along line 4—4 of FIG. 3;

FIG. 5 is an exploded sectional view of the clamp of FIG. 2;

FIG. 6 is a view similar to FIG. 3 of a safety apparatus in accordance with a second embodiment of the present invention; and FIG. 7 is a view similar to FIG. 3 of a safety apparatus in accordance with a third embodiment of the present invention.

DESCRIPTION OF PREFERRED EMBODIMENTS

Figure 1:
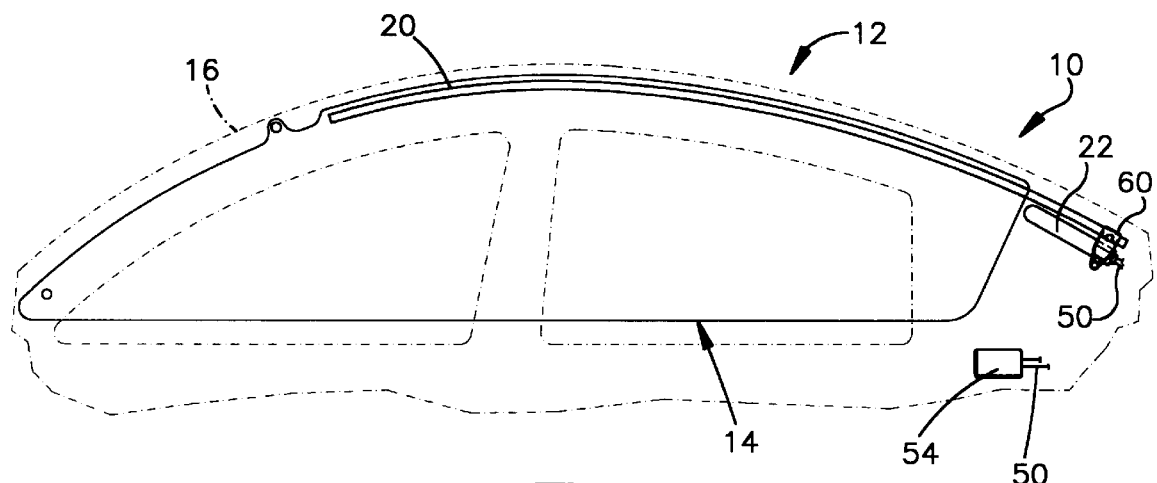
FIG. 1 is a schematic illustration of a vehicle safety apparatus in accordance with the present invention.
Figure 2:
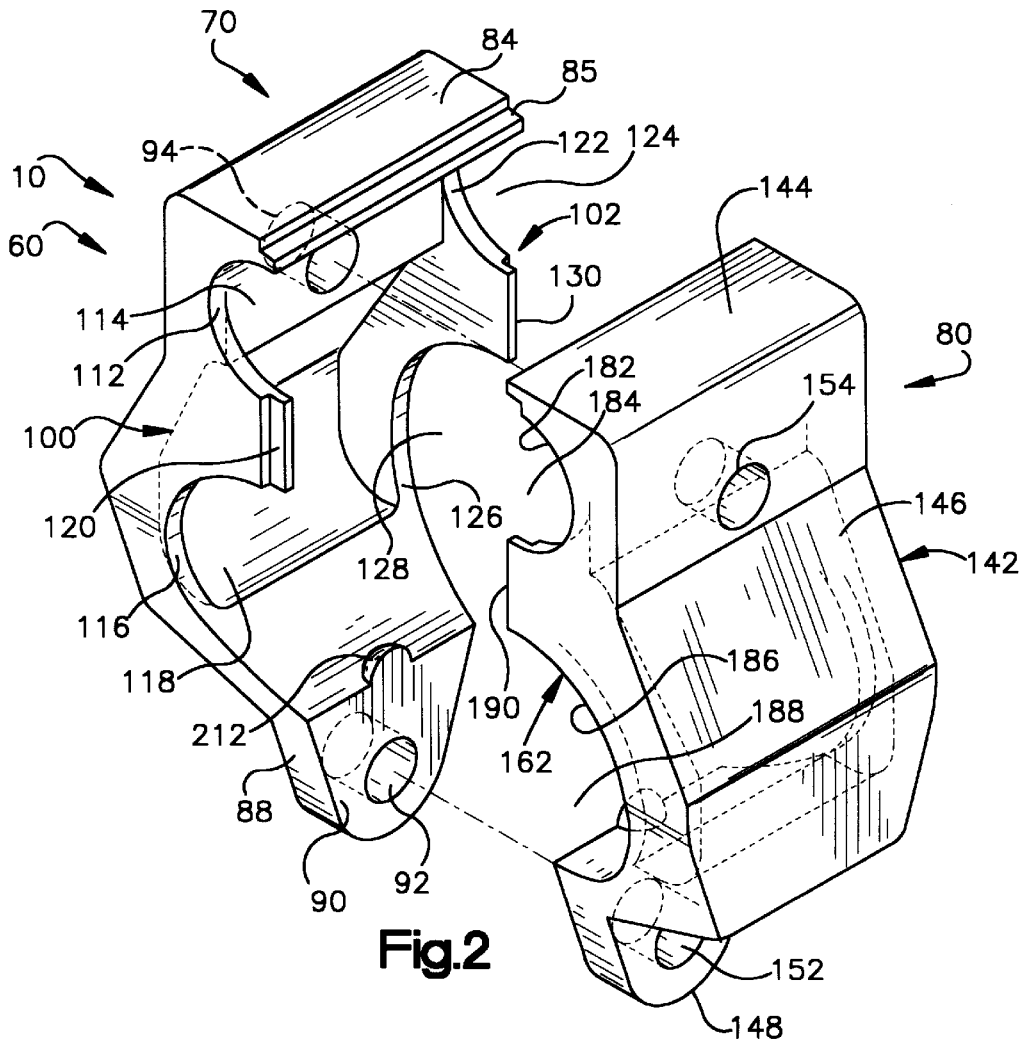
FIG. 2 is an exploded perspective view of a clamp which forms part of the safety apparatus of FIG. 1.

The present invention relates to a vehicle safety apparatus. In particular, the present invention relates to an inflatable vehicle occupant protection device, such as a side curtain assembly, for helping to protect a vehicle occupant in the event of a side impact to a vehicle. As representative of the present invention, FIG. 1 illustrates schematically a vehicle safety apparatus 10 for helping to protect an occupant of a vehicle 12.

The safety apparatus 10 includes an inflatable vehicle occupant protection device in the form of a side curtain 14. The side curtain 14 is mounted adjacent the side structure 16 of the vehicle 12, including side windows, together with a fill tube 20. The side curtain 14 is movable, upon actuation of an inflator 22, from a deflated and stowed condition (not shown) to an inflated condition as illustrated in FIG. 1. In its inflated condition, the side curtain 14 can help to protect an occupant of the vehicle 12 in the event of a side impact to the vehicle.

The fill tube 20 (FIGS. 1 and 3–4) has an elongate configuration including parallel, cylindrical inner and outer surfaces 32 and 34. The fill tube 20 is mounted to and extends along the length of the vehicle side structure 16, and has a curved configuration to match the vehicle side structure. The fill tube 20 has a first end portion 36 for receiving inflation fluid from the inflator 22. A V-shaped notch 38 cut in the end portion 36 defines an inlet 40 into the fill tube 20.

The inflator 22 (FIGS. 3 and 4) preferably contains a stored quantity of pressurized inflation fluid (not shown) in the form of a gas to inflate the side curtain 14. The inflator 22 alternatively could contain a combination of pressurized inflation fluid and ignitable material for heating the inflation fluid, or could be a pyrotechnic inflator which uses the combustion of gas-generating material to generate inflation fluid.

The inflator 22 has a tubular configuration including an axially extending, cylindrical side wall 42 having a cylindrical outer surface 44. Two sets of inflation fluid outlets 46 and 48 are formed in the side wall 42, on diametrically opposite sides of the inflator 22. Lead wires 50 extends from one end of the inflator 22.

The inflator 22 preferably contains a stored quantity of pressurized inflation fluid in the form of gas to inflate the side curtain 14. The inflator alternatively could contain a combination of pressurized inflation fluid and ignitable material for heating the inflation fluid, or could be a pyrotechnic inflator which uses the combustion of gas-generating material to generate inflation fluid.

The vehicle 12 includes known means indicated schematically at 54 (FIG. 1) for sensing a collision involving the vehicle and for actuating the inflator 22 in response to the sensing of a collision. The means 54 may include a deceleration sensor and vehicle electric circuitry for actuating the inflator 22 in response to sensing a vehicle deceleration indicative of a vehicle collision having a severity greater than a predetermined threshold value. As discussed below, the means 54 provides an electric signal over the lead wires 50 to the inflator 22, when the inflator is to be actuated.

The safety apparatus 10 includes a clamp 60 (FIGS. 2–5) for supporting the inflator 22 on the fill tube 20. The clamp 60 includes first and second clamp parts 70 and 80 which are similar to each other in configuration. Each one of the first and second clamp parts 70 and 80 fits over one of the sets of inflation fluid outlets 46 or 48 in the inflator 22 and over the inlet 40 of the fill tube 20. The clamp parts 70 and 80 cooperate to direct inflation fluid from the inflator 22 to the fill tube 20, as described below.

The first clamp part 70 (FIGS. 2 and 5) is preferably cast from aluminum or another metal. The first clamp part 70 could, alternatively, be molded from plastic or machined from metal.

The first clamp part 70 has a side wall 82 which extends over the full height (as viewed in FIGS. 2–5) of the part. The side wall 82 of the first clamp part 70 has an upper fastener portion 84, a central portion 86, and a lower fastener portion 88. The central portion 86 of the side wall 82 projects outward from the upper and lower fastener portions 84 and 88 of the side wall to form a somewhat C-shaped configuration when viewed in section through both clamp parts 70 and 80, as in FIGS. 4 and 5.

The lower fastener portion 88 of the side wall 82 is formed as a bolting flange having a planar inner side surface 90. A bolt hole 92 extends through the flange 88. A second bolt hole 94 is formed in the side wall 82, adjacent the upper fastener portion 84 of the side wall. The upper fastener portion 84 of the side wall 82 has a sealing lip 85 for engaging a complementary sealing lip 145 on the second clamp part 80 as described below.

The first clamp part 70 also has first and second end walls 100 and 102 which, when the clamp 60 is mounted on the inflator 22, are spaced apart axially along the inflator. The end walls 100 and 102 project inward from the side wall 82 to a central plane 110 (FIGS. 4 and 5) of the assembled clamp 60. The central plane 110 defines generally the inner boundary of the end walls 100 and 102 and, thus, of the first clamp part 70.

The first end wall 100 (FIG. 2) of the first clamp part 70 has a generally planar configuration. An arcuate edge surface 112 on the first end wall 100, adjacent the upper fastener portion 84 of the side wall 82, defines a semi-circular fill tube cutout 114 in the first end wall. The fill tube cutout 114 is centered on the central plane 110. The diameter of the fill tube cutout 114 is the same as the outer diameter of the fill tube 20.

Another arcuate edge surface 116 on the first end wall 100 defines a semi-circular inflator cutout 118 in the first end wall. The inflator cutout 118 is spaced from the fill tube cutout 114 and is centered on the central plane 110. The diameter of the inflator cutout 118 is the same as the outer diameter of the inflator 22. In the illustrated embodiment, the inflator cutout 118 has a diameter of about 30 mm, and the fill tube cutout 114 has a diameter of about 16 mm. The first end wall 100 also includes a sealing lip 120 located between the cutouts 114 and 118.

The second end wall 102 (FIGS. 2 and 5) of the first clamp part 70 is a mirror image of the first end wall 100. The second end wall 102 has a generally planar configuration. An arcuate edge surface 122 on the second end wall 102, near the upper fastener portion 84 of the side wall 82, defines a semi-circular fill tube cutout 124 in the second end wall. The fill tube cutout 124 is centered on the central plane 110 and has the same diameter as the outer diameter of the fill tube 20.

Another arcuate edge surface 126 on the second end wall 102 defines a semi-circular inflator cutout 128 in the second end wall, spaced from the fill tube cutout 124. The inflator cutout 128 is centered on the central plane 110 and has the same diameter as the outer diameter of the inflator 22. A sealing lip 130 is formed on the second end wall 102, between the cutouts 124 and 128.

The first and second end walls 100 and 102 of the first clamp part 70, and the side wall 82, define a fluid flow area 132 in the first clamp part 70. The fluid flow area 132 extends between the inflator cutout 118 and the fill tube cutout 114, at one end of the first clamp part 70, and the inflator cutout 128 and the fill tube cutout 124 at the other end of the first clamp part.

The second clamp part 80 (FIGS. 2 and 5) is identical to the first clamp part 70 except that the second clamp part has sealing lips which are complementary to those of the first clamp part. Specifically, the second clamp part 80 has a side wall 142 which extends over the full height (as viewed in FIGS. 2–5) of the second clamp part. The side wall 142 of the second clamp part 80 has an upper fastener portion 144, a central portion 146, and a lower fastener portion 148. The central portion 146 of the side wall 142 projects outward from the upper and lower fastener portions 144 and 148 of the side wall to form a somewhat C-shaped configuration when viewed in section. The lower fastener portion 148 of the side wall 142 is formed as a bolting flange having a planar inner side surface 150. A bolt hole 152 extends through the flange 148.

A second bolt hole 154 is formed in the side wall 142, near the upper fastener portion 144 of the side wall. The upper fastener portion 144 of the side wall 142 has a sealing lip 145 which has a configuration complementary to that of the sealing lip 85 on the first clamp part 70.

The second clamp part 80 also has first and second end walls 160 and 162 which, when the clamp 60 is mounted on the inflator 22, are spaced apart axially along the inflator. The end walls 160 and 162 project inward from the side wall to the central plane 110 (FIGS. 4 and 5) of the assembled clamp. The central plane 110 defines generally the inner boundary of the end walls 160 and 162 and, thus, of the second clamp part 80.

The first end wall 160 (FIG. 5) of the second clamp part 80 has a generally planar configuration. An arcuate edge surface 172 on the first end wall 160, adjacent the upper fastener portion 144 of the side wall 142, defines a semi-circular fill tube cutout 174 in the first end wall. The fill tube cutout 174 is centered on the central plane 110. The diameter of the fill tube cutout 174 is the same as the outer diameter of the fill tube 20.

Another arcuate edge surface 176 on the first end wall 160 defines a semi-circular inflator cutout 178 in the first end wall, spaced from the fill tube cutout 174. The inflator cutout 178 is centered on the central plane 110 and has the same diameter as the outer diameter of the inflator 22. A sealing lip 180 is formed on the first end wall 160, between the cutouts 174 and 178. The configuration of the sealing lip 180 on the first end wall 160 of the second clamp part 80 is complementary to that of the sealing lip 130 on the second end wall 102 of the first clamp part 70.

The second end wall 162 (FIG. 2) of the second clamp part is a mirror image of the first end wall 160. The second end wall 162 has a generally planar configuration. An arcuate edge surface 182 on the second end wall 162, adjacent the upper fastener portion 144 of the side wall 142, defines a semi-circular fill tube cutout 184 in the second end wall. The fill tube cutout 184 is centered on the central plane 110 and has the same diameter as the outer diameter of the fill tube 20.

Another arcuate edge surface 186 on the second end wall 162 defines a semi-circular inflator cutout 188 in the second end wall, spaced from the fill tube cutout 184. The inflator cutout 188 is centered on the central plane 110 and has the same diameter as the outer diameter of the inflator 22. A sealing lip 190 is formed on the second end wall 162, between the cutouts 184 and 188. The configuration of the sealing lip 190 on the second end wall 162 of the second clamp part 80 is complementary to that of the sealing lip 120 on the first end wall 100 of the first clamp part 70.

The first and second end walls 160 and 162 of the second clamp part 80, and the side wall 142 define a fluid flow area 192 (FIGS. 4 and 5) in the second clamp art 80. The fluid flow area 192 extends between the inflator cutout 178 and the fill tube cutout 174, at one end of the second clamp part 80, and the inflator cutout 188 and the fill tube cutout 184 at the other end of the second clamp part.

The first and second clamp parts 70 and 80, when bolted together, hold the inflator 22 on the fill tube 20. A bolt 200 extends through the bolt holes 92 and 152 in the first and second clamp parts 70 and 80. A bolt 202 extends through the bolt holes 94 and 154 in the first and second clamp parts 70 and 80. Nuts 204 screwed on the bolts 200 and 202 secure the two clamp parts 70 and 80 in position relative to each other, clamped on the inflator 22 and the fill tube 20.

In this clamped condition, the sealing lip 85 (FIG. 5) on the upper fastener portion 84 of the first clamp part 70 engages and seals against the complementary sealing lip 145 on the upper fastener portion 144 of the second clamp part 80. The sealing lip 120 (FIG. 2) on the first end wall 100 of the first clamp part 70 engages and seals against the complementary shaped sealing lip 190 on the second end wall 162 of the second clamp part 80. The sealing lip 130 on the second end wall 102 of the first clamp part 70 engages and seals against the sealing lip 180 on the first end wall 160 of the second clamp part 80.

The bolting flange 88 on the first clamp part 70 engages the bolting flange 148 on the second clamp part 80. The fluid flow area 132 in the first clamp part 70 is in fluid communication with the fluid flow area 192 in the second clamp part 80. Together the flow areas 132 and 192 form a fluid flow passage or chamber 210 in the clamp 60.

The inflator extends through and is clamped in the four inflator cutouts 118, 128, 178 and 188 in the first and second clamp parts 70 and 80. The edge surface 116 (FIG. 2) on the first clamp part 70 and the edge surface 186 on the second clamp part 80 are joined to form a circular surface which clamps against the cylindrical outer surface 44 of the inflator 22. The edge surface 126 (FIG. 5) on the first clamp part 70 and the edge surface 176 on the second clamp part 80 are joined to form a circular surface which clamps against the cylindrical outer surface 44 of the inflator 22. The edge surfaces 116 and 186 are spaced axially from the edge surfaces 126 and 176, along the length of the inflator 22.

The inflator 22 thus extends through the chamber 210 in the clamp 60. The clamp 60 is located axially on the inflator 22 so that the two sets of inflation fluid outlets 46 and 48 of the inflator open into the chamber 210 in the clamp. Specifically, the inflation fluid outlets 48 open into the fluid flow area 132 in the first clamp part 70. The inflation fluid outlets 46 open into the fluid flow area 192 in the second clamp part 80.

The fill tube 20 extends through and is clamped in the four fill tube cutouts 114, 124, 174 and 184 in the first and second clamp parts 70 and 80. The edge surface 112 (FIG. 2) on the first clamp part 70 and the edge surface 182 on the second clamp part 80 are joined to form a circular surface which clamps against the cylindrical outer surface 34 of the fill tube 20. The edge surface 122 (FIG. 5) on the first clamp part 70 and the edge surface 172 on the second clamp part 80 are joined to form a circular surface which clamps against the cylindrical outer surface 34 of the fill tube 20. The edge surfaces 112 and 182 are spaced axially from the edge surfaces 122 and 172, along the length of the fill tube 20.

The fill tube 20 thus extends through the chamber 210 in the clamp 60. The clamp 60 is located axially on the fill tube 20 so that the inlet 40 in the fill tube opens into the chamber 210 in the clamp. A projection 212 on the clamp 60 is received in a dimple 214 on the inflator 20 to block rotational and axial movement of the inflator relative to the clamp.

The upper bolt 202 is received in the notch 38 to block axial and rotational movement of the fill tube 20 relative to the clamp 60. The clamp 60 holds the inflator 22 at a location spaced apart from and parallel to the fill tube 20. The clamp 60 is the only support for the inflator 22. The chamber 210 establishes fluid communication between the inflation fluid outlets 46 and 48 of the inflator and the inlet 40 of the fill tube 20.

In the event of an impact to the vehicle 12 of a magnitude greater than the predetermined threshold value, the sensing means 54 provides an electrical signal over the lead wires 50 to the inflator 22. The inflator 22 is actuated in a known manner and discharges inflation fluid under pressure from the inflation fluid outlets 46 and 48. The inflation fluid flows into the chamber 210 in the clamp 60. The inflation fluid flows through the chamber 210 and into the inlet 40 of the fill tube 22, as indicated by the arrows in FIG. 4. The side curtain 14 inflates under the pressure of the inflation fluid from the fill tube 22.

FIG. 6 illustrates a safety apparatus 10a constructed in accordance with a second embodiment of the present invention. The safety apparatus 10a is generally similar in construction and operation to the safety apparatus 10 (FIGS. 1–5). Parts of the safety apparatus 10a which are identical to the corresponding parts of the safety apparatus 10 (FIGS. 1–5) are given the same reference numerals. Similar parts are given the same reference numeral with the suffix "a" added.

In the safety apparatus 10a, the inflator 22 is not mounted parallel to the fill tube 20a. As illustrated, the inflator 22 extends perpendicular to the fill tube 20a. The clamp 60a covers an open end 39 of the fill tube 20a. Inflation fluid from the inflation fluid outlets of the inflator 20 can flow into the open end 39 of the fill tube 20a, as well as into the inlet defined by the V-shaped notch 38a.

FIG. 7 illustrates a safety apparatus 10b constructed in accordance with a third embodiment of the present invention. The safety apparatus 10b is generally similar in construction and operation to the safety apparatus 10 (FIGS. 1–5). Parts of the safety apparatus 10b which are identical to the corresponding parts of the safety apparatus 10 (FIGS. 1–5) are given the same reference numerals. Similar parts are given the same reference numeral with the suffix "b" added.

In the safety apparatus 10b, the inflator 22b is mounted parallel to and substantially coaxial with the fill tube 20b. The inflation fluid outlets 46b on the inflator 22b are formed on a projecting end portion 24b of the inflator. The clamp 60b covers the end portion 24b of the inflator 22b and an open end 39 of the fill tube 20b. Inflation fluid from the inflator 22b can flow into the open end 39 of the fill tube 20b, as well as into the inlet defined by the V-shaped notch 38b.

From the above description of the invention, those skilled in the art will perceive improvements, changes and modifications in the invention. For example, a safety apparatus in accordance with the present invention can also be used for inflating a driver's side air bag, a passenger side air bag, or a side impact air bag which is seat mounted or door mounted. Such improvements, changes and modifications within the skill of the art are intended to be covered by the appended claims.

Having described the invention, I claim:

1. An apparatus for inflating an inflatable vehicle occupant protection device, said apparatus comprising:

an inflator for providing inflation fluid for inflating said protection device;

a fill member for directing inflation fluid into said protection device; and a clamp for connecting said inflator with said fill member, said clamp having a first portion which clamps on said inflator, a second portion which clamps on said fill member, and a fluid flow passage extending between said first and second portions of said clamp for directing inflation fluid from said inflator to said fill member.

2. An apparatus as set forth in claim 1 wherein said clamp comprises first and second clamp parts clamped together on said inflator and on said fill member.

3. An apparatus as set forth in claim 2 wherein each one of said first and second clamp parts defines a respective fluid flow area in said clamp, said fluid flow areas together forming said fluid flow passage for directing inflation fluid from said inflator to said fill member.

4. An apparatus as set forth in claim 1 wherein said inflator has an inflation fluid outlet which opens into said fluid flow passage and said fill member has an inflation fluid inlet which opens into said fluid flow passage.

5. An apparatus as set forth in claim 1 wherein said inflator and said fill member extend through said fluid flow passage in said clamp, said clamp including first and second clamp parts clamped together on opposite sides of said inflator and on opposite sides of said fill member.

6. A vehicle occupant safety apparatus for helping to protect an occupant of a vehicle having a side structure, said safety apparatus comprising:

an inflatable vehicle occupant protection device having a deflated condition and having an inflated condition in which said protection device is inflated between the occupant and the vehicle side structure;

an inflator for providing inflation fluid for inflating said protection device;

a fill tube for directing inflation fluid into said protection device; and a support for supporting said inflator and said fill tube relative to each other, said support comprising a clamp having a first portion clamped on said inflator and a second portion clamped on said fill tube, said support having a fluid flow passage for directing inflation fluid from said inflator to said fill tube.

7. An apparatus as set forth in claim 6 wherein said clamp comprises first and second clamp parts clamped together on opposite sides of said inflator and on opposite sides of said fill tube.

8. An apparatus as set forth in claim 7 wherein each one of said first and second clamp parts defines a respective fluid flow area in said clamp, said fluid flow areas together forming said fluid flow passage for directing inflation fluid from said inflator to said fill tube.

9. An apparatus as set forth in claim 6 wherein said inflator has an inflation fluid outlet which communicates with said fluid flow passage and said fill tube has an inflation fluid inlet which communicates with said fluid flow passage.

10. An apparatus as set forth in claim 9 wherein said inflator and said fill tube extend through said fluid flow passage in said support.

* * * * *